P. Thiry,
Horseshoe.
No. 35,958. Patented July 22, 1862.
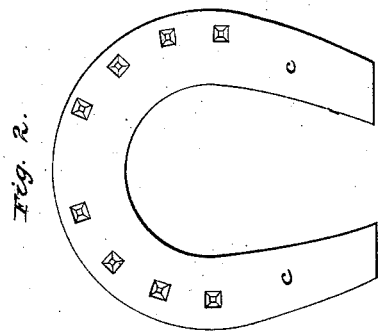
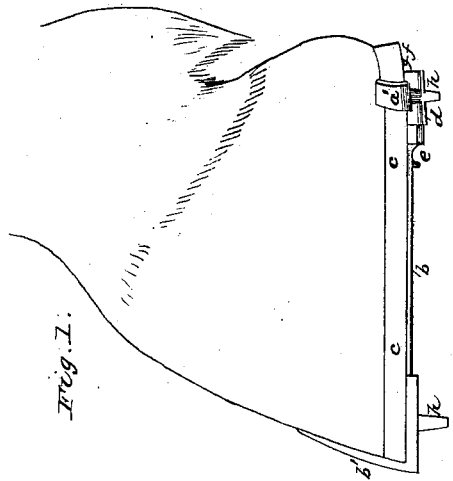
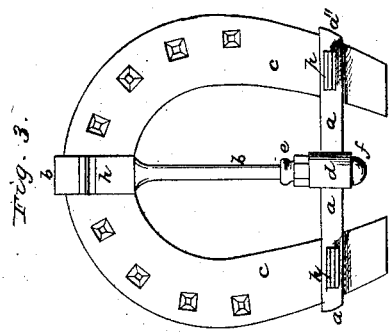
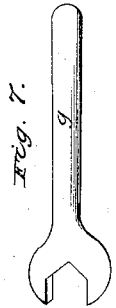
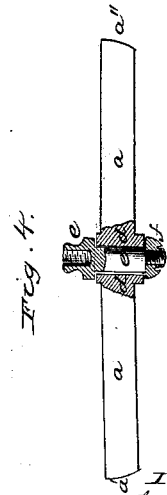
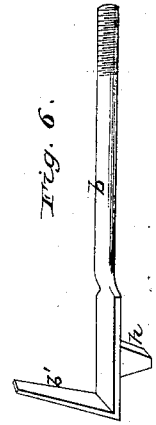
Witnesses:
Henry E. Jacobs
Wm. H. Harrison
Inventor:
Pierre Thiry

UNITED STATES PATENT OFFICE.

PIERRE THIRY, OF PARIS, FRANCE.

IMPROVEMENT IN HORSESHOES.

Specification forming part of Letters Patent No. 35,958, dated July 22, 1862.

*To all whom it may concern:*

Be it known that I, PIERRE THIRY, of Paris, in the French Empire, have invented a new and useful Improvement in Frost-Shoes or Adjustable Calks for Horses, Mules, and other Shod Animals; and I hereby declare the following to be a full, clear, and exact description of the same.

Sudden changes of temperature in the winter season often produce a hard, glazed, and slippery condition of the roads. These transitions take travelers, mounted or in vehicles, conductors, or wagoners unawares at great distances from blacksmith-shops, and they are thus unable to proceed. To obviate these and other inconveniences is the object of my invention; and it consists in a portable apparatus applicable and adjustable to the ordinary shoes of horses or other shod animals, to prevent them from slipping in frosty weather.

To enable others skilled in the art to make and use my improvement, I will now proceed to describe its construction, arrangement, and operation, referring to the accompanying drawings, in which—

Figure 1 represents, in illustration of my invention, the hoof of a mule provided with an adjustable frost-shoe or calks applied to the ordinary shoe. Fig. 2 is a plan view of such ordinary muleshoe; Fig. 3, a plan view of the same shoe furnished with the adjustable calks or spikes. Figs. 4, 5, and 6 are detail views of the latter, and Fig. 7 is a key or wrench for putting the calks or spikes on and off the shoes.

This improved apparatus consists of two principal parts, one, $a$, extending across the foot, and the other, $b$, which I term the "toe-clip," extending from the toe backward to unite with the cross-piece. The ends of the cross-piece are turned up, as at $a'$ and $a''$, to embrace the shoe $c$ on each side. In the center of the transverse or cross piece is a hollow boss or collar, $d$, in which a tapped nut, $e$, is fitted by means of a rivet, $f$, in such manner as to be capable of being turned in the collar without liability to become detached therefrom. The toe-piece terminates at front with a rising projection, $b'$, which clips over the toe of the shoe and the front of the hoof. It is threaded at the end, which extends backward and enters the threaded nut. The cross-piece and the toe-piece carry spikes or calks $h$, projecting down, by means of which a good foothold for the animal on slippery roads is insured. After applying the cross and toe pieces and engaging the thread on the back end thereof in the nut the latter must be turned by means of a wrench or key, $g$, to insure the apparatus remaining fixed until it is desired to remove it.

Having thus described my invention, I claim—

The herein-described apparatus to be applied to the shoes of horses, mules, and other shod animals to prevent them from slipping in frosty weather, the same consisting of a brace extending across the foot and a toe-clip extending from the toe backward, when both are provided with spikes, and are constructed to operate substantially in the manner and for the purposes herein set forth.

In testimony whereof I have signed my name to this specification before two subscribing witnesses.

P. THIRY.

Witnesses:
 GEO. HUTTON,
 L. CLAÉS.